United States Patent [19]

Burgio et al.

[11] Patent Number: 4,944,681

[45] Date of Patent: Jul. 31, 1990

[54] PLUSH TOY WITH EAR SYSTEM FOR DISPLAYING NORMAL AND ABNORMAL EARDRUMS

[76] Inventors: Paul A. Burgio, 4279 Brigadoon, Shoreview, Minn. 55126; C. Randall Nelms, Jr., 15 Ridge Rd., N. Oaks, St. Paul, Minn. 55127

[21] Appl. No.: 296,082

[22] Filed: Jan. 11, 1989

[51] Int. Cl.$^5$ .............................................. G09B 23/28
[52] U.S. Cl. ..................................... 434/270; 434/267
[58] Field of Search ...................... 434/267, 270, 271; 350/4.1, 4.2

[56] References Cited

U.S. PATENT DOCUMENTS

| | | | |
|---|---|---|---|
| 2,152,424 | 3/1939 | Wetmore | 350/4.2 |
| 2,697,303 | 12/1954 | Maynard . | |
| 2,748,530 | 6/1956 | Stecker . | |
| 2,778,125 | 1/1957 | Hantman | 434/267 |
| 2,959,891 | 11/1960 | Barnett et al. . | |
| 3,298,132 | 1/1967 | Elwell . | |
| 3,471,844 | 10/1969 | Breckwoldt | 434/247 |
| 3,471,944 | 10/1969 | Breckwoldt . | |
| 3,624,942 | 12/1971 | Klohr | 434/270 |
| 3,858,351 | 1/1975 | Porter . | |
| 3,888,233 | 6/1975 | Ware . | |
| 3,905,130 | 9/1975 | Gordon et al. | 434/271 |
| 4,075,782 | 2/1978 | Neuschatz . | |
| 4,209,919 | 7/1980 | Kirikae et al. | 434/267 |
| 4,231,634 | 11/1980 | Gantz et al. | 350/4.2 |
| 4,443,200 | 4/1984 | Murphy | 434/247 |
| 4,710,145 | 12/1987 | Vandis . | |

*Primary Examiner*—Edward M. Coven
*Assistant Examiner*—Valerie Szczepanik
*Attorney, Agent, or Firm*—Merchant, Gould, Smith, Edell, Welter & Schmidt

[57] ABSTRACT

An ear examination simulator unit for use by parents, children and health care professionals to recognize ear disorders in children includes an ear structure simulator module that is mounted within a head portion of a furry racoon or the like animal facsimile. The ear structure simulator module includes a tube body having orifices defined in ends thereof for receiving an otoscope or other examination tool. Mounted within the tube portion is a semi-translucent membrane and a photographic slide depicting an eardrum in normal or various diseased states. A source of illumination provides light which is distributed by the membrane in order to provide back lighting of the images on the photograpic slide. In addition, the membrane may be textured and colored so as to simulate a human eardrum in its healthy state. The plush toy provides comfort to the child during painful bouts of ear infections and during ear surgery.

1 Claim, 2 Drawing Sheets

PLUSH TOY WITH EAR SYSTEM FOR DISPLAYING NORMAL AND ABNORMAL EARDRUMS

BACKGROUND OF THE INVENTION

1. Field of the Invention

The present invention relates to ear examination simulators which may be used by parents, educators or the like to develop the skills to use an otoscope and the skill to recognize normal and diseased eardrums. More particularly, the present invention relates to an ear examination simulator unit which may be mounted within the head of a plush toy such as a teddy bear so that it may readily be used as a teaching tool for parents and children alike.

2. Description of the Prior Art

Teaching devices have been used in medical schools and other advanced educational environments to teach the anatomical details of the human ear. An example of such a device is described in U.S. Pat. No. 2,778,125 to Hantman. The Hantman device simulates the various physical features of the interior of the human ear, ear canal and eardrum. Unfortunately, though, it fails to provide any images for students to view of an ear in various states of disease. In addition, these types of teaching tools are fairly expensive, which makes them prohibitive for use by school nurses or parents in diagnosing ear disorders of children.

It is clear that there has existed a long and unfilled need in the prior art for an ear examination simulator unit for use in practicing ear examinations which is not prohibitively expensive, is capable of showing an ear in various diseased states and may conveniently be used by parents, health care professionals and children to diagnose ear disorders.

SUMMARY OF THE INVENTION

Accordingly, it is an object of the invention to provide an ear examination simulator unit which is not prohibitively expensive, is capable of displaying the human ear in various diseased states and that can conveniently be used by health care professionals, parents and children to recognize ear disorders.

A simulator unit for use in practicing ear examinations according to the invention may comprise an elongate tube member having an inner space defined therein; a first opening in one end of the elongate tube member which is adapted to receive an otoscope; structure for positioning a photographic slide within the inner space defined in the elongate tube member; and structure on an opposite side of the positioning structure from the first opening for providing illumination; whereby images of diseased ears may be viewed through an otoscope by placing an appropriate slide in the positioning structure and by inserting the otoscope into the first opening.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
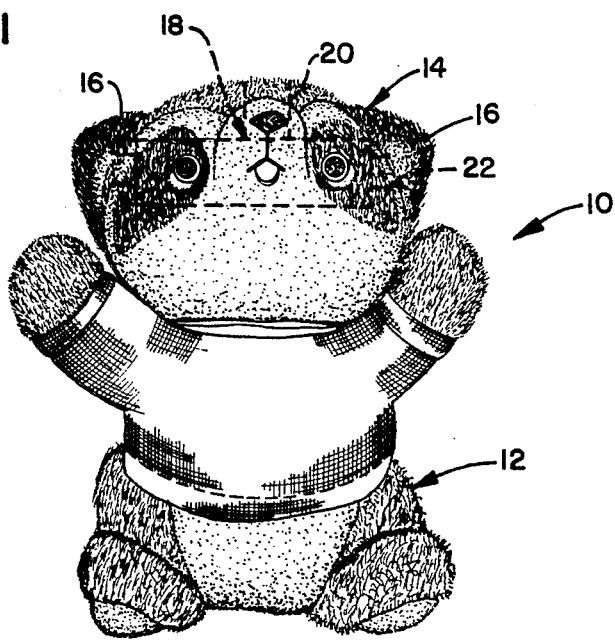
FIG. 1 is a perspective view of a simulator unit constructed according to a first preferred embodiment of the present invention.

Referring to the drawings, wherein like reference numerals designate corresponding structure throughout the views, and particularly referring to FIG. 1, an ear examination simulator subject 10 according to a first preferred embodiment of the invention is shaped as a plush toy having a body portion 12 and a head portion 14. In the embodiment shown in FIG. 1, subject 10 is formed as a furry racoon, but it should be understood that other animal facsimiles such as teddy bears or human-like forms could just as easily be used. Referring again to FIG. 1, head portion 14 includes a pair of ears 16 each having an ear access opening 22 defined therein. Positioned within a recess defined in head portion 14 is an ear structure simulator module 18, which is shown in dashed lines in FIG. 1. Ear access openings 22 communicate with end portions of the simulator module 18, and an access hole 20 may be formed in the top or back of head portion 14 to expose a central portion of the ear structure simulator module 18.

Figure 2:
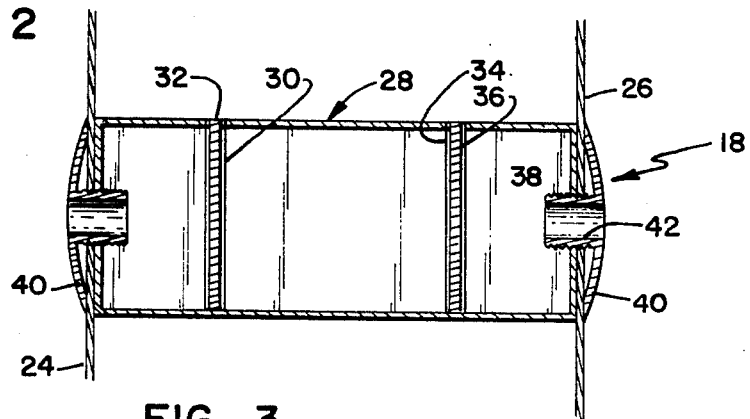
FIG. 2 is a cross-sectional view of an ear structure simulator module according to the embodiment of FIG. 1.

Referring now to FIG. 2, ear structure simulator module 18 is secured between first and second walls 24, 26 of the head portion 14. Simulator module 18 is formed of a tube portion 28 which in the preferred embodiment has a rectangular cross-section and has a pair of orifices 38 defined centrally in end portions thereof. Tube 28 could alternatively be given a circular cross section. Within a space defined inside tube portion 28 is a first mounting structure 30 and a second mounting structure 34. A photographic slide 32 or similar transparency is secured with respect to tube portion 28 by the first mounting structure 30, as is shown in FIG. 2. In order to replace the photographic slide 32 with a substitute image bearing transparency, tube portion 28 may have one or more slots defined therein through which slide 32 may be withdrawn.

In order to provide back lighting of photographic slide 32 within its mount structure 30, a semi-translucent membrane 36 is provided within the second mounting structure 34. Membrane 36 is designed to evenly disperse light which enters the nearest orifice 38, so as to enable the image on photographic slide 32 to be viewed by inserting an otoscope into the orifice 38 which is proximate the photographic slide 32. In practice, a penlight or other illumination device may be inserted into the orifice 38 proximate membrane 36, while the speculum of the otoscope may be inserted into the orifice 38 proximate photographic slide 32.

In the preferred embodiment, membrane 36 is formed of a material which is similar in color and texture to a human eardrum. As a result, a child, parent or health care professional can view an image of a simulated eardrum by inserting the otoscope into the orifice 38 located nearest to the eardrum. A ventilation tube can be inserted into the simulated eardrum in a similar manner as would be done clinically.

Figure 3:
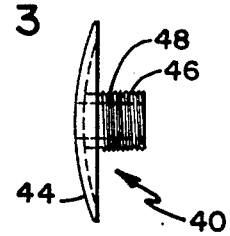
FIG. 3 is a plan view of a retainer cap used in the embodiment of FIG. 1.

In order to secure tube portion 28 of the simulator module 18 to the first and second walls 24, 26 of head portion 14, a pair of retainer caps 40 are provided. As may be seen in FIG. 3, each retainer cap 40 has a retainer head 44 flanging outwardly from a threaded nipple portion 46 so as to permit to the first and second walls 24, 26 of head portion 14 to be clamped between retainer heads and the respective end portions of tube portion 28, as is shown in FIG. 2. Nipple portion 46 has ratchet teeth 48 formed thereon which are sized to lockingly engage the respective orifices 38 on tube portion 28. Each retainer cap 40 has an ear canal opening 42 defined therein to permit communication between the inner space within tube portion 28 to each of the ear access openings 22 provided in head portion 14 of the simulator subject 10. When it is desired to use the simulator module 18 in conjunction with an animal-like subject 10, otoscopes, penlights and like accessories must inserted into an opening 42 to gain access to the respective orifice 38.

Figure 4:
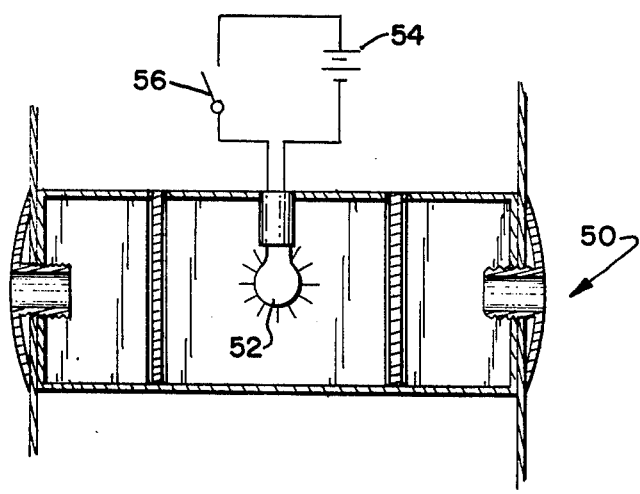
FIG. 4 is a cross-sectional view of an ear structure simulator module constructed according to a second embodiment of the invention.

Referring now to FIG. 4, a second embodiment 50 of the ear structure simulator module includes an electric lamp 52 which is mounted in tube portion 28 between photographic slide 32 and membrane 36. Lamp 52 may selectively be provided with electricity from a power supply 54 by means of switch 56. Thus, by closing switch 56, electric lamp 52 is caused to emit light, obviating the need to insert a penlight or the like through the orifice 38 provided proximate membrane 36. In this way, membrane 36 will also be illuminated for viewing through an otoscope, which gives an observer a better view of what the simulated eardrum looks like with or without a ventilation tube.

Figure 5:
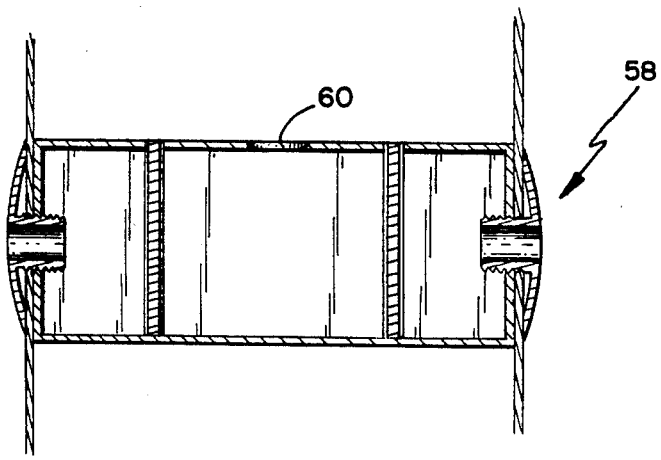
FIG. 5 is a cross-sectional view of an ear structure simulator module constructed according to a third embodiment of the invention.

A third embodiment 58 of the ear structure simulator module is illustrated in FIG. 5. In this embodiment, an access opening 60 is defined in an intermediate section of tube portion 28. Access opening 60 is in communication with access hole 20 that is defined in the head portion 14 of the ear examination simulator subject 10. As a result, a penlight or other source of illumination may be inserted through access hole 20 and access opening 60 so as to emit light within the space defined between photographic slide 32 and membrane 36. As a result, the images provided on photographic slide 32 may be viewed through the orifice 38 located proximate thereto, in the manner described in reference to previously mentioned embodiments.

Alternatively, simulator module 18 may be utilized apart from the animal facsimile simulator subject 10. In this case, the orifices 38 may be secured directly to an otoscope in place of the speculum. The pictures of the normal and diseased eardrums can be changed and compared with the view of a child's eardrum viewed simultaneously or separately.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A simulator unit for use in learning about ear conditions, comprising:
   an animal-like plush toy having a head portion, said head portion having ear openings defined therein;
   an elongate tube member in said head portion having an inner space defined therein;
   a first opening in one end of said elongate tube member which is adapted to receive an otoscope, said first opening being substantially aligned with and in communication with one of said ear openings; a second opening in the other end of said elongate tube member, said second opening being substantially aligned with and in communication with another of said ear openings;
   means for positioning a photographic slide within the inner space defined in said elongate tube member; and
   means on an opposite side of said positioning means from said first opening for providing illumination said illumination means comprising membrane means positioned between said positioning means and said second opening; whereby images of normal or diseased ears may be viewed through an otoscope by placing an appropriate slide in said positioning means and by inserting the otoscope into said first opening.

* * * * *

UNITED STATES PATENT AND TRADEMARK OFFICE
CERTIFICATE OF CORRECTION

PATENT NO. : 4,944,681

DATED : July 31, 1990

INVENTOR(S) : Burgio et al.

It is certified that error appears in the above-identified patent and that said Letters Patent is hereby corrected as shown below:

In the Abstract, Line 5,
  delete the word "the" after the word --or--

In the Abstract, Line 13,
  delete "photograpic" and insert therefor --photographic--

Signed and Sealed this

Second Day of June, 1992

Attest:

DOUGLAS B. COMER

Attesting Officer          Acting Commissioner of Patents and Trademarks